United States Patent
Yang (10) Patent No.: US 6,295,973 B1
(45) Date of Patent: Oct. 2, 2001

(54) AIR-FUEL CHARGE CONTROLLER FOR A HOMOGENEOUS-CHARGE, COMPRESSION-IGNITION ENGINE

(75) Inventor: Jialin Yang, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/470,359

(22) Filed: Dec. 22, 1999

(51) Int. Cl.⁷ .................................................. F02M 31/00
(52) U.S. Cl. .................................................. 123/543
(58) Field of Search ................... 123/543, 544, 123/545, 546, 547, 557

(56) References Cited

U.S. PATENT DOCUMENTS

| | | |
|---|---|---|
| 3,974,808 | 8/1976 | Heitert . |
| 4,167,165 * | 9/1979 | Finlay et al. ........................ 123/543 |
| 4,261,316 * | 4/1981 | Motosugi et al. ................... 123/543 |
| 4,395,998 * | 8/1983 | Chou .................................. 123/543 |
| 4,494,516 | 1/1985 | Covey, Jr. . |
| 4,768,481 | 9/1988 | Wood . |
| 5,046,473 | 9/1991 | Hokenson . |
| 5,408,973 | 4/1995 | Spangjer . |

FOREIGN PATENT DOCUMENTS 29 36 127 A1    9/1979  (DE) .

OTHER PUBLICATIONS

"Compression —Ignited Homogeneous Charge Combustion", by Paul M. Najt et al, SAE Technical Paper No. 830264, 1983, pp. 1–15.

* cited by examiner

Primary Examiner—Marguerite McMahon
(74) Attorney, Agent, or Firm—Jerome R. Drouillard (57) ABSTRACT

A homogeneous-charge, compression-ignition engine having engine coolant, an intake manifold and an exhaust manifold including a controller for advancing and retarding auto-ignition in the combustion chamber of the engine, the intake manifold providing a premixed combustible charge of air and fuel, the intake manifold having dual intake portions, one portion supplying unheated gas, and the other providing gas heated by engine coolant or exhaust gas, or both. A flow distributor valve in the intake manifold gas flow passages varies the intake temperature, thereby controlling auto-ignition timing and the combustion rate in the engine combustion chamber during the portion of the combustion cycle in which a homogeneous-charge, compression-ignition event occurs. The engine includes a spark ignition system for initiating combustion when the engine load, for a given speed, increases to a defined level and when the engine speed for a given load increases to a defined level.

12 Claims, 5 Drawing Sheets

AIR-FUEL CHARGE CONTROLLER FOR A HOMOGENEOUS-CHARGE, COMPRESSION-IGNITION ENGINE

TECHNICAL FIELD

The invention relates to a controller for the timing of auto-ignition for homogeneous-charge, compression-ignition engines.

BACKGROUND OF THE INVENTION

It is known practice to design four-stroke cycle internal combustion engines to accommodate homogeneous-charge, compression-ignition (HCCI) combustion wherein light-load operation can be achieved with minimal throttling. This results in fuel economy comparable to the fuel economy of a diesel engine of the same displacement. A homogeneous charge of fuel and air is used in a HCCI engine in a manner similar to the use of air-fuel mixture in a spark-ignited engine, but the homogeneous charge is compressed to auto-ignition. The homogeneous-charge, compression-ignition engine thus has characteristics that are comparable in some respects to an engine with a diesel cycle.

The temperature of an air-fuel mixture in the combustion chamber of a homogeneous-charge, compression-ignition engine (HCCI) is high enough to initiate auto-ignition. The homogeneous air-fuel mixture is created either in the intake manifold or in the cylinder by early fuel injection and fast fuel-air mixing. A homogeneous air-fuel mixture in the intake manifold may be achieved, as in the case of a conventional auto cycle engine, by using a fuel-aspirating carburetor or by using a low-pressure fuel injection pump and nozzle. No spark ignition is necessary when the HCCI engine is operating in a specified operating region of the load and engine speed relationship.

It is known design practice also to expand the useful operating region of the load and engine speed relationship by using a hybrid ignition controller wherein spark ignition can be relied upon during operation at high loads and at high engine speeds with moderate loads. Thus, at lower loads, the engine can be operated in HCCI combustion mode with high dilution of the air-fuel mixture using a high air-fuel ratio or a high exhaust gas recirculation rate in order to limit the rate of combustion of the homogeneous air-fuel mixture. If the mixture is too rich, on the other hand, the rate of combustion becomes too fast and engine knocking or detonation may occur.

HCCI engines are characterized by minimal variation in the combustion of the air-fuel mixture since the initiation of combustion takes place throughout the entire mixture rather than at a single point from which a flame front develops. Instabilities of flame propagation are avoided.

An HCCI engine has reduced levels of nitrous oxide ($NO_x$) in the exhaust gases. This is due to the low combustion temperature of the diluted mixture. It is characterized also by reduced soot or particulates in the emission due to the premixed lean mixture.

The thermal efficiency of an HCCI engine is higher than the thermal efficiency typically associated with spark ignition engines of known designs. This is due to the high compression ratio that can be used. It is due also to the unthrottled operation of the air-fuel mixture at the intake manifold, which reduces engine pumping losses. High specific heat ratios, reduced radiation heat loss and reduced cycle-to-cycle variations in combustion are further characteristics of HCCI engines where combustion does not rely upon in-cylinder air flow conditions.

The limitations of HCCI engines of known design relate to the control of the timing of the auto-ignition event and the combustion rate for the air-fuel mixture in the combustion chamber. Since combustion begins with auto-ignition of a premixed air-fuel mixture, the ignition may occur at any time during the compression process. If the engine load increases, auto-ignition tends to advance and the combustion rate tends to increase due to the rich mixture characteristic of an increased load. Thermal efficiency may decrease due to early heat release before top dead center. This results in roughness of the engine due to rapid and early combustion. $NO_x$ emissions also increase due to increased burnt gas temperature of the less diluted mixture. When the engine load decreases, on the other hand, auto-ignition tends to be retarded, which may result in misfire.

Although it is possible to control auto-ignition by changing the temperature of the air-fuel mixture at the intake manifold using electrical heater devices to promote auto-ignition, such heaters are impractical for high volume production engines used in the automotive industry.

BRIEF DESCRIPTION OF THE INVENTION

It is an objective of the invention to promote efficient combustion in a HCCI engine and to control auto-ignition timing by controlling intake air temperature. This objective is achieved by using a split air intake system to heat the intake air and to adjust the intake air temperature according to the operating conditions. The temperature adjustment of the air-fuel mixture is fast enough to accommodate rapid changes in engine load.

The invention uses hot exhaust gases and engine coolant as thermal energy sources for heating the intake air mixture. According to one embodiment of the invention, the heating of the intake air is controlled by a variable conductance heat pump wherein thermal energy is transferred from the exhaust port to the intake port.

According to another embodiment of the invention, the transfer of thermal energy can take place with a rapid response to the intake air-fuel mixture temperature change by using a dual intake system with two intake passages. When air flows through one passage, it is heated by hot exhaust gases or engine coolant, or both, using heat exchangers. The air or air-fuel mixture in the other passage is unheated. The flow of air in the two passages is mixed at the intake port of the cylinder (or cylinders is in the case of a multiple-cylinder engine). The temperature of the air or the mixed air-fuel flow depends on the mass flow rates in the two passages, one flow rate being the flow rate for the hot gases and the other flow rate being the flow rate for the cooler gases. The relative mass flow rates of the hot and cooler gases are controlled by a flow distribution valve, or by dual intake valves which can change the gas flow through each of the two passages.

During operation in the region of the load-speed characteristic where HCCI combustion occurs, the gases in the intake manifold pass mainly through the heated passage, which results in higher intake air temperatures to promote auto-ignition. Variation in air-flow distribution of the two passages will vary the intake air temperature when the operating conditions are changed.

When the load of the engine increases, HCCI combustion becomes unacceptable because the combustion rate may be too high due to the less-diluted mixture. The engine then may operate under high load conditions with a conventional spark ignition combustion mode. To avoid detonation (knocking) when the engine operates in the spark ignition combustion mode, the intake air temperature should be as low as possible so that the effective compression ratio and the thermal efficiency can be as high as possible. To reduce intake air temperature, the heated air passage closes and the unheated passage opens.

When the engine load decreases, the combustion mode can be switched back from the spark ignition mode to the HCCI operating mode. At that time the intake air temperature should be boosted to promote auto-ignition.

To increase air temperature, the heated passage opens, and the unheated passage closes. There is no thermal inertia involved in this operating sequence. The response of the temperature change of the intake air is fast enough to accommodate rapid changes in engine load.

BRIEF DESCRIPTION OF THE DRAWINGS

FIG. 9b is a schematic representation of the embodiment of the invention shown in FIG. 9a, but it illustrates a multiple cylinder engine rather than the single engine of FIG. 9a.

BEST MODE FOR PRACTICING THE INVENTION

Figure 1:
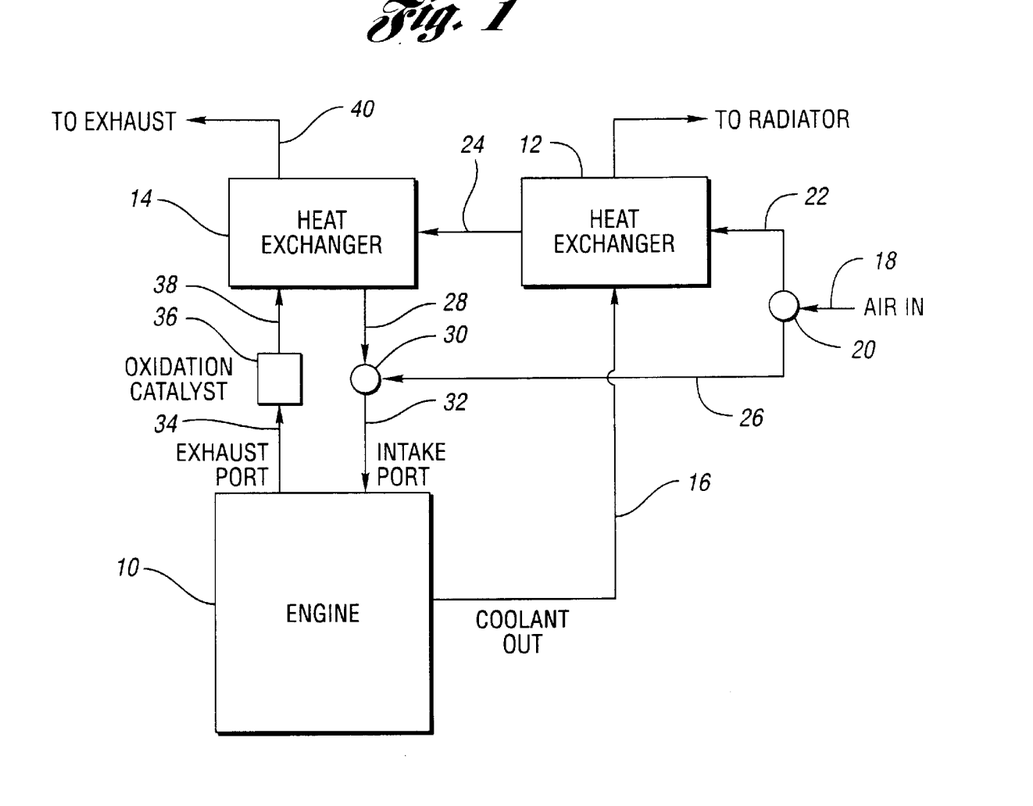
FIG. 1 is a schematic block diagram of the split dual air-fuel intake system for the HCCI engine of the invention.

FIG. 1 shows in schematic block diagram form a homogeneous-charge, compression-ignition engine system with one or more cylinders. It includes an internal combustion engine 10. Engine coolant circulates through the engine block of the engine 10 in the usual fashion. The coolant flows through outlet coolant flow passage 16 at a temperature that typically would be about 90° C. It is received by heat exchanger 12, which is a liquid-to-air heat exchanger that forms a part of the engine radiator.

An air intake flow passage 18 delivers air to mixing point 20. A portion of the intake air flow is distributed through flow passage 22 to the heat exchanger 12. The outlet side of the heat exchanger 12 distributes heated air, typically at a temperature of about 70° C., through passage 24. That heated air is transferred through heat exchanger 14. This increases the temperature of the air before it is delivered to heat exchanger outlet passage 28. The temperature at passage 28 may be about 200° C.

A portion of the intake air is delivered from mixing point 20 through passage 26 to the mixture point 30. The heated air in the passage 28 is combined at mixing point 30 with the cooler air in passage 26. The combined flow is distributed to the engine intake port through passage 32.

The engine exhaust gases pass from the engine exhaust port and through exhaust flow passage 34 to a catalytic converter 36. The outlet side of the catalytic converter delivers heated exhaust gases in passage 38 to heat exchanger 14. The exhaust from the heat exchanger 14 passes through exhaust passage 40. Typically, the temperature at the flow input side of the heat exchanger 14 would be above 300° C.

The presence of the catalytic converter at 36 between the exhaust port and the heat exchanger 14 will use the boosted temperature level by intake air heating, thereby making removal of unburned hydrocarbons and carbon monoxide in the exhaust more efficient.

Figure 2:
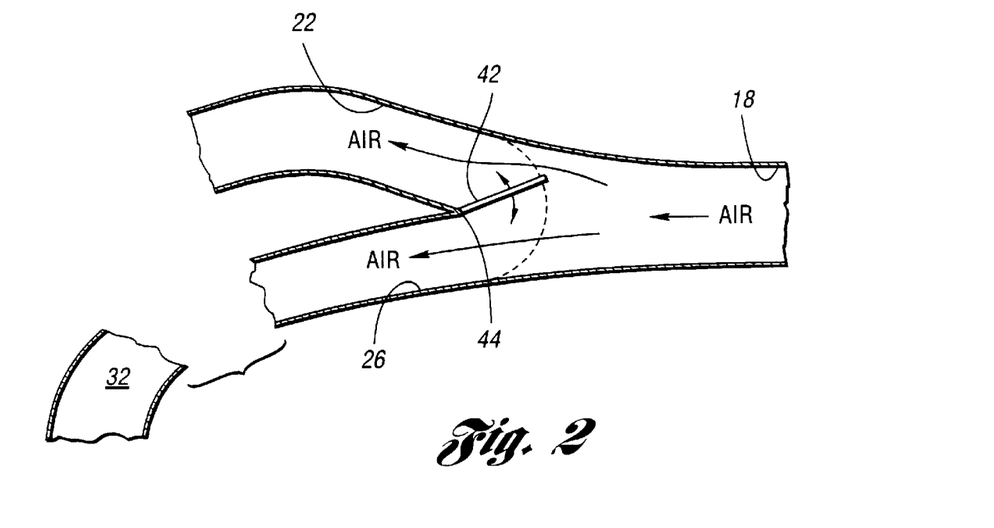
FIG. 2 is a detailed schematic view of the air-fuel mixture flow distributor valve in the intake manifold of the HCCI engine of the invention.

FIG. 2 shows a control valve at mixing point 20. The valve includes a movable damper plate valve 42, which is pivoted at 44 on a stationary portion of the intake manifold system. When it is in the position shown in FIG. 2, it partially blocks the passage of air from passage 18 to passage 22. It permits free flow of cool air from passage 18 to passage 26.

When the valve 42 is moved in a clockwise direction about the pivot 44, a greater percentage of air will be distributed through passage 22 compared to the air flow through passage 26.

Air in passage 22 is heated by the heat exchangers before it passes to mixing point 30 through passage 28 and to the passage 32. The temperature of the gases at the intake port thus can be controlled by appropriately adjusting valve 42. Adjustment of valve 42 will result in a near instantaneous intake air temperature response.

In an alternative design, the valve 42 may be located at mixing point 30 rather than at mixing point 20.

The temperature of the mixed intake air at passage 32 depends upon the mass flow rates of the air in the two passages 22 and 26. The air in passage 22 is heated, and the air in passage 26 is cool. Variation of the air flow distribution in these two passages will vary the effective air intake temperature when operating conditions vary.

If the engine load increases to a high value, the engine combustion efficiency will become unacceptable because the combustion rate would be too high due to the less diluted mixture. The engine, when operating at such high loads, then must be operated with a spark ignition combustion mode. Undesirable detonation or knocking, however, always is an issue when the engine is operating in the spark ignition combustion mode. To avoid detonation, the intake air temperature should be as low as possible so that the effective compression ratio and the thermal efficiency can be as high as possible. To reduce the intake air temperature, the heated air passage 22 is fully closed by the valve 42. Passage 26, which is the cool air passage, at that time is fully opened. On the other hand, when the engine load decreases, the engine can be switched from the spark ignition combustion mode to the homogeneous-charge, compression-ignition operating mode. The intake air temperature at that time must be boosted in order to achieve auto-ignition. To increase the air temperature, the heated air passage opens, and the unheated air passage closes.

Because there is little or no thermal inertia involved in switching from one combustion mode to the other, the temperature change response can be fast enough to allow a rapid change in engine load.

Figure 3:
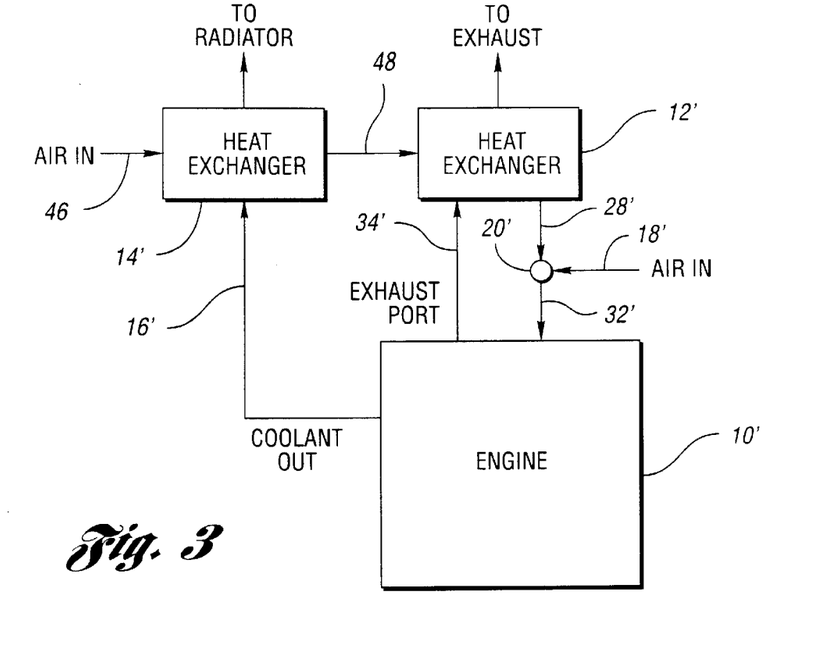
FIG. 3 is an alternate arrangement of the HCCI system of the invention.

FIG. 3 shows a variation of the homogeneous-charge, compression-ignition engine of the invention. As in the case of the system of FIG. 1, the system of FIG. 3 includes an internal combustion engine 10', a first heat exchanger 12', a second heat exchanger 14', and a single mixing point 20'. There is no counterpart in the embodiment of FIG. 3 for the mixing point 30 seen in FIG. 1.

Air is distributed to the mixing point 20' through intake air flow passage 18'. It is distributed to the intake port of the engine through flow passage 32'.

The exhaust port of the engine distributes heated exhaust gases through passage 34' to the heat exchanger 12'. This raises the temperature of the gases passing from the heat exchanger 12' through passage 28'. A second inlet air passage, shown at 46, distributes air through heat exchanger 14'. Engine coolant is distributed to the coolant outlet flow passage 16' to the heat exchanger 14'.

The engine coolant heats the air introduced to the heat exchanger 14' at 46. The outlet side of the heat exchanger 14' distributes heated air through passage 48 to the heat exchanger 12'. Thus, the thermal energy of exhaust gases, as well as the thermal energy of the coolant, is distributed through the heat exchangers to the mixing point 20' so that air introduced at 18' will be heated before it is transferred to the intake port flow passage 32' together with the heated air in flow passage 28' that is introduced at intake air passage 46.

A baffle-type control valve corresponding to the control valve shown in FIG. 2 is located at mixing point 20'. By adjusting the angle of the baffle valve 42. The relative rates of flow through the cool air passage and through the heated air passage can be adjusted, thereby controlling the auto-ignition point in the engine combustion chamber.

In FIG. 3, prime notations are used with the reference numerals to indicate structures in the embodiment of FIG. 3 that have corresponding numerals in the embodiment of FIG. 1.

Figure 4:
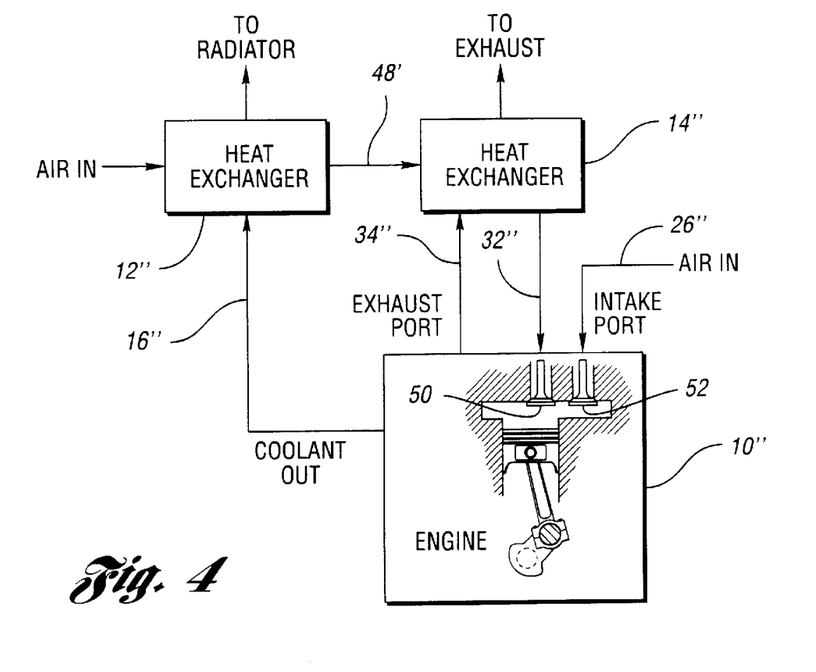
FIG. 4 is a second alternate embodiment of the HCCI engine of the invention.

FIG. 4 shows an embodiment of the invention wherein two intake valves are used, one of which receives cool air through cool air passage 26", which corresponds to the cool air passage 26 in FIG. 1. The heated air passage 32", which corresponds to heated air passage 32 in the embodiment of FIG. 1, communicates with a separate air intake valve. Air in passage 32" is heated by heat exchanger 14", which corresponds to the heat exchanger 14 of the embodiment of FIG. 1.

Heat exchanger 12" in FIG. 4, which corresponds to the heat exchanger 12 in the embodiment of FIG. 1, receives hot engine coolant through passage 16". Heat is transferred to the intake air by the heat exchanger 12" and is distributed to the second heat exchanger 14' through passage 48'. The exhaust port for the engine 10" communicates with exhaust passage 34".

The intake valves for the engine 10" are identified by reference numerals 50 and 52. These, respectively, communicate with the flow passages 32" and 26". The rates of flow through the passages 26" and 32" can be controlled by controlling the valve timing and the valve opening for the valves 50 and 52. In this way, the temperature of the charge admitted to the combustion chamber can be controlled, thereby controlling the auto-ignition point.

Figure 5A:
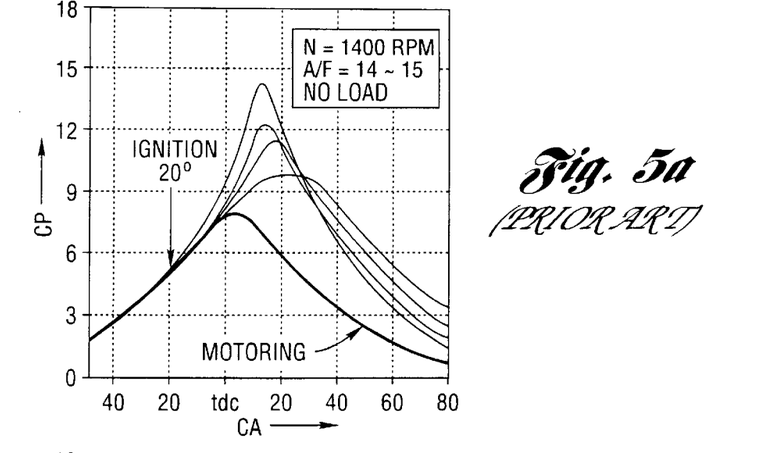
FIG. 5a is a plot showing the cylinder pressure and crank angle relationship for a conventional spark ignition engine.

FIG. 5a is a representation of the relationship between combustion pressure and crank angle for a spark ignition engine. FIG. 5a shows a family of curves for various combustion cycles for a spark ignition engine. There are wide cycle-to-cycle variations in the plots indicated in FIG. 5a.

Figure 5B:
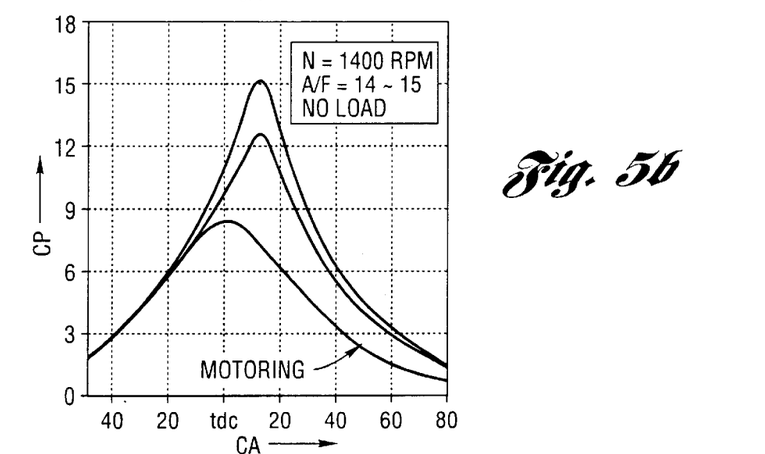
FIG. 5b shows the relationship between crank angle and combustion pressure for the HCCI engine of the invention.

FIG. 5b is a plot corresponding to the plot of FIG. 5a, but it indicates the relationship between combustion pressure and crank angle for the homogeneous-charge, compression-ignition engine of the invention when the engine is operating in its optimum operating region. FIG. 5b indicates that there are very small cycle-to-cycle variations in the pressure versus crank angle characteristic.

Figure 6:
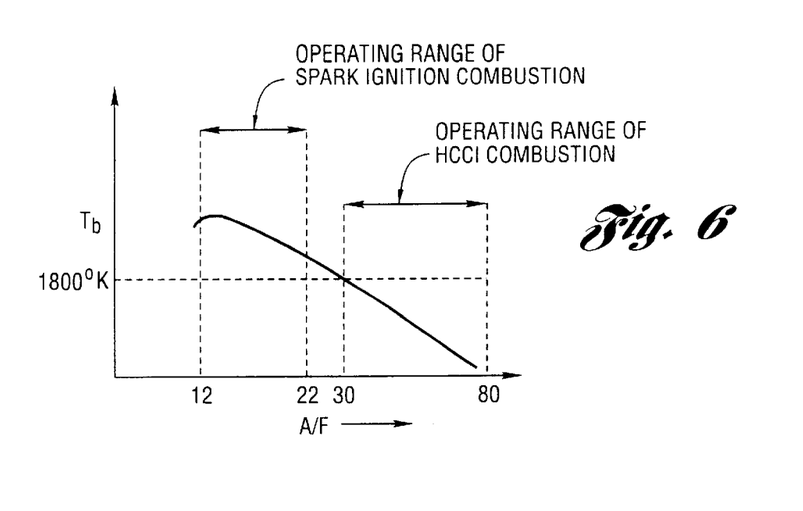
FIG. 6 is a plot of air-fuel ratio and the burn temperature for a spark ignition engine of conventional design and for a HCCI engine.

The plot of FIG. 6 represents the temperature of the burn versus air-fuel ratio for a spark ignition engine and for the HCCI engine of the invention. Typically, the air-fuel mixture burns in a spark ignition engine, following ignition, with a flame front that proceeds from the point of ignition throughout the combustion chamber region. As the flame progresses across the combustion chamber, the temperature of the burn changes. If the air-fuel ratio is high, there is minimal nitrogen oxide ($NO_x$) in the exhaust gases. When the air-fuel ratio is low, the $NO_x$ level is high. Typically, the air-fuel ratio operating range for an internal combustion engine would be between 12 and 22.

In contrast to the narrow operating range for a spark-ignition engine shown in FIG. 6, the homogeneous-charge, compression-ignition engine of the invention can operate with a very lean mixture (e.g., with an air-fuel ratio as high as 80. The lean operation capability results in low burned gas temperature (e.g., below 1800° K), and extremely low $NO_x$ emissions. It also results in higher thermal efficiency due to the reduced engine pumping loss and higher gas specific heat ratios.

Figure 7:
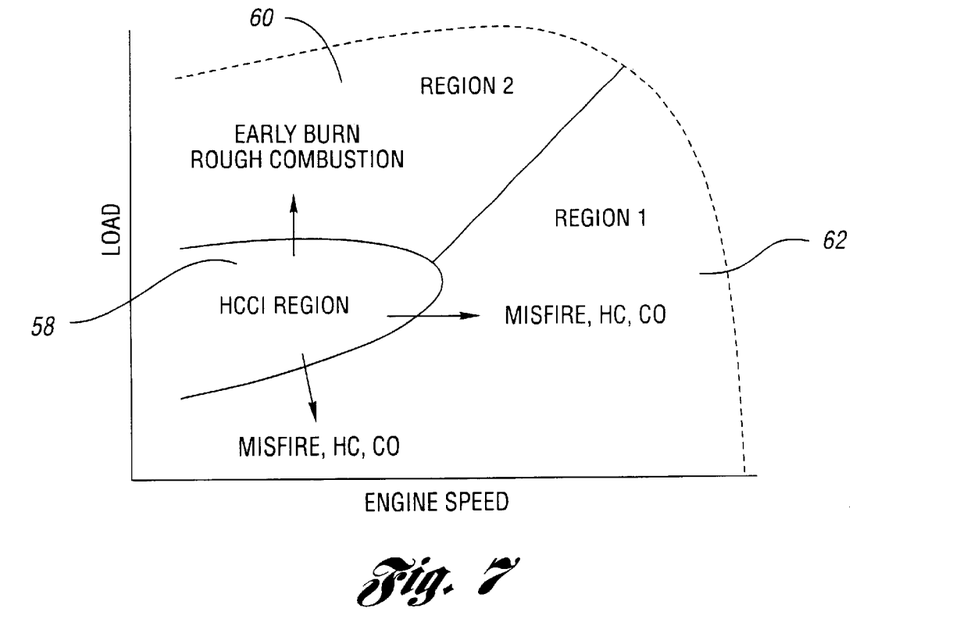
FIG. 7 is a plot of the load-speed characteristic for the HCCI engine of the invention.

It has been shown experimentally that the region of optimum performance for the homogeneous-charge, combustion-ignition engine is limited without using the teachings of the invention. This is demonstrated in the plot of FIG. 7 where the region for optimum performance is shown at 58. FIG. 7 is a plot of the engine load versus engine speed. If the load on the engine should increase beyond the region 58, the burn of the combustible mixture is started by auto-ignition too early to achieve efficient combustion. This operating region is identified by reference numeral 60 in FIG. 7. On the other hand, if the load on the engine should be decreased and the engine speed load characteristic is shifted to region 62 in FIG. 7, the engine is susceptible to misfire, which increases hydrocarbon emissions and carbon monoxide emissions.

When the engine performance moves to either region 60 or to region 62, the controller for the engine will automatically enter the spark ignition operating mode, and the air valve 42, as seen in FIG. 2, will be moved to the position that will admit more cool air to the intake port.

The operating characteristics for region 60 can be improved while the engine continues to operate in the homogeneous-charge, combustion-ignition mode by decreasing the charge temperature. This is done by using the air valve 42, by reducing internal exhaust gas recirculation, by controlling the coolant temperature, by controlling coolant temperature, by retarding intake valve closing time to reduce effective compression ratio, by using cooled external exhaust gas recirculation, or by supercharging with intercool. Any one or all seven of these controls can be implemented.

Figure 8:
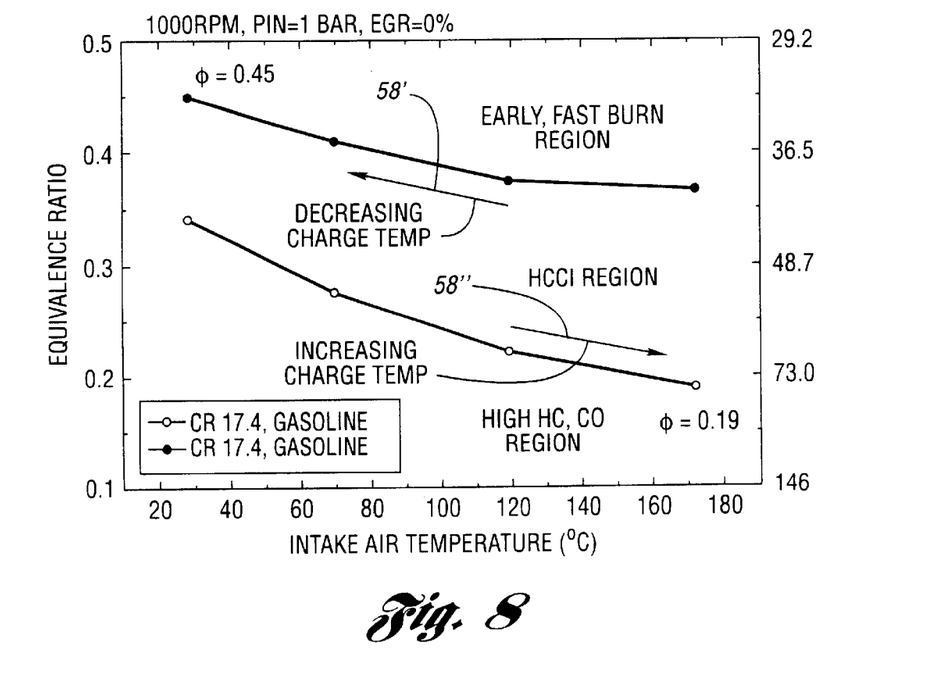
FIG. 8 is a plot of equivalence ratio versus air intake temperature for the HCCI engine of the invention as the charge temperature is either decreased or increased.

FIG. 8 shows the effect of decreasing or increasing the charge temperature in this fashion. The homogeneous-charge, compression-ignition operating region can be enlarged, as seen in the plot of FIG. 8, by gradually decreasing the air intake temperature to achieve a higher equivalence ratio. This relationship between equivalence ratio and air intake temperature is shown by the upwardly extending reference arrow 58' in FIG. 8a. For purposes of this description, the equivalence ratio is defined as the ratio of the actual fuel-air ratio to the stoichiometric ratio.

The performance of the engine in operating region 62 can be improved by increasing the charge temperature by heating the intake air or using more exhaust gas recirculation, or by using engine coolant control. As the intake air temperature increases, the equivalence ratio will decrease as indicated by the downwardly directed arrow 58" in FIG. 8b.

Figure 9A:
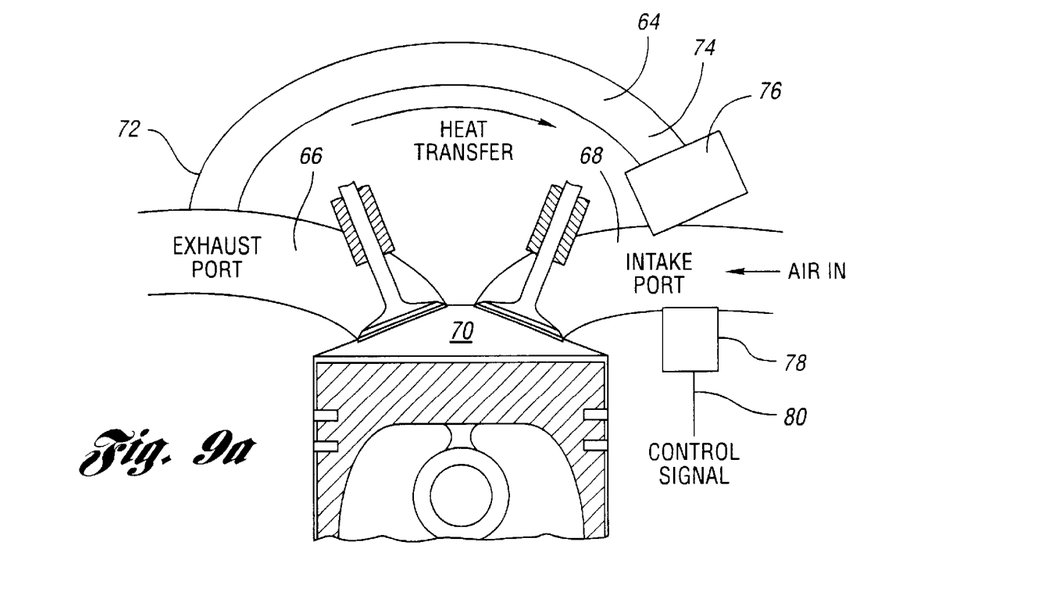
FIG. 9a is a schematic representation of another embodiment of the invention wherein thermal energy is transferred from the exhaust port to the intake manifold through a variable conductance heat pipe.
Figure 9B:
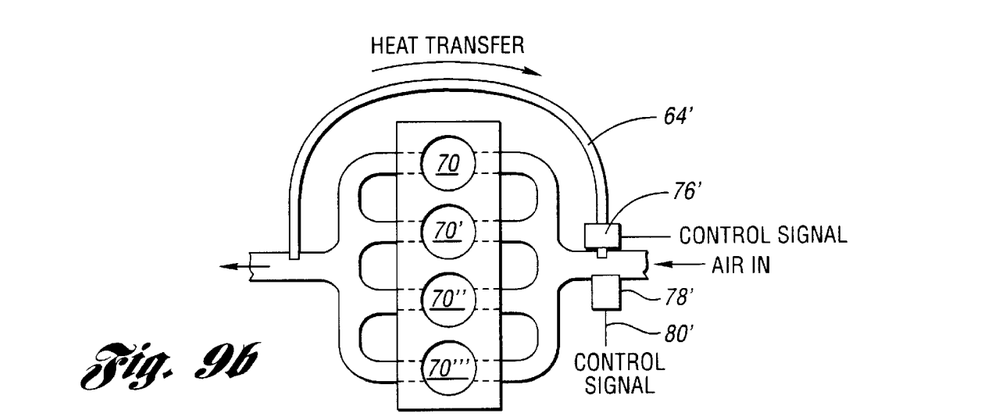

An alternate way to control ignition timing for a homogenous-combustion, compression-ignition engine may include a heat pipe, as indicated in FIGS. 9a and 9b. The engine system of FIGS. 9a and 9b includes a variable conductance heat pipe 64 that extends from exhaust port 66 to intake port 68. The intake port distributes air from the intake manifold to the combustion chamber 70. Exhaust gases from the chamber 70 pass through exhaust port 66, thereby raising the temperature of the heat input end 72 of the heat pipe 64. The heat output end of the heat pipe 64 is seen at 74.

The interior of the heat pipe contains a vapor. A vapor flow control valve or heat conductance valve 76 may be used to control the flow of the vapor in the heat pipe. In this way, the amount of heat transferred from the exhaust port 66 to the intake port 68 can be controlled.

Figure 10:
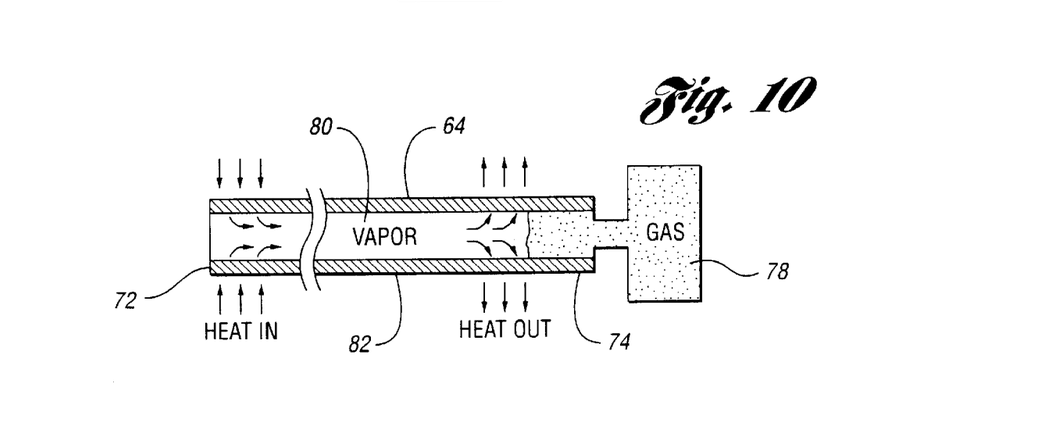
FIG. 10 is a schematic, cross-sectional diagram of a heat pipe with variable conductance, which may be used in the embodiments shown in FIGS. 9a and 9b.

This variable conductance heat pipe concept can be understood by referring to FIG. 10. As seen in FIG. 10, the heat pipe 64 is connected to a reservoir 78 of relatively large volume, which is filled with a non-condensing gas. The thermal conductance of the heat pipe is automatically varied by blocking the action of the non-condensing gas in the reservoir. During normal operation, the interior of the heat pipe, which contains a working fluid vapor 80, tends to pump the non-condensing gas back into the reservoir. The vapor-gas interface is located at variable positions along the condenser 82. The presence of a non-condensable gas in a portion of the condenser prevents the vapor from condensing in that area.

When the heat load at the source 72 increases, the vapor pressure in the active portion of the heat pipe rises, compresses the gas and increases the active region of the condenser. This has the effect of reducing the interface thermal resistance. The effect of the increased heat load is to reduce the internal thermal resistance of the condenser, which in turn counterbalances the increase in vapor pressure and the heat transfer rate. The heat pipe temperature then can be maintained in a desired range.

The heat pipe consists of a sealed aluminum or copper container with inner surfaces that have a capillary wicking material. The interior of the container is a liquid under its own pressure. The liquid enters the pores of the capillary material, thereby wetting all internal surfaces. When heat is applied at 72 along the surface of the heat pipe, the liquid at that point tends to boil and enter a vapor state. When that happens, the liquid picks up the latent heat of vaporization. The gas, which then has a higher pressure, moves inside the sealed container to a cooler location where it condenses. The gas thus gives off its latent heat of vaporization and moves heat from the input end to the output end of the heat pipe.

Heat pipes of this kind are commercially available from Noren Products Incorporated, of Menlo Park, Calif.

The embodiment of FIG. 9b shows a single heat pipe for controlling the inlet air for each of four cylinders rather than a single cylinder as illustrated in FIG. 9a. The cylinders are identified in FIG. 9b by reference numerals 70, 70', 70" and 70'''. As in the case of the embodiment of FIG. 9a, the embodiment of FIG. 9b includes a conductance control device 76', which may be a valve for controlling the rate of transfer of liquid from one end of the heat pipe to the other.

To reduce the response time of the intake air heating, an electrical heater can be installed at the intake port, as seen at 78 in FIG. 9a and at 78' in FIG. 9b. This heater will work only when the engine load decreases rapidly. As the port temperature increases to a predetermined temperature for any given load, the electrical heater is turned off, and the heat pipe then functions in its normal fashion to heat the intake air.

The control devices 78 and 78' respond to a control signal distributed to the heater through signal control lines 80 and 80', seen respectively in FIGS. 9a and 9b. The control signal is present for the electrical heaters when the engine processor identifies a sudden increase in engine load.

Although the preferred embodiments of the invention have been disclosed, it will be apparent to persons skilled in the art that modifications may be made to the invention without departing from the scope of the invention. All such modifications and equivalents thereof are covered by the following claims.

What is claimed is:

1. A homogeneous-charge, compression-ignition engine system having a gas charge intake manifold and an exhaust gas manifold, an engine having a gas charge combustion chamber, a gas charge intake in the combustion chamber communicating with the intake manifold, and an exhaust port in the combustion chamber communicating with the exhaust manifold;
    means for recovering thermal energy of exhaust gas and for transferring it to the gas charge in the intake manifold; and
    means for adjusting the rate of heat transfer from the exhaust manifold to the combustion chamber whereby timing of auto-ignition of the air-fuel mixture in the combustion chamber is controlled during a combustion cycle.

2. A homogeneous-charge, compression-ignition engine system having a gas charge intake manifold and an exhaust gas manifold, an engine having a gas charge combustion chamber, a gas charge intake in the combustion chamber communicating with the intake manifold, and an exhaust port in the combustion chamber communicating with the exhaust manifold;
    means for recovering thermal energy of exhaust gas and for transferring it to the gas charge in the intake manifold; and
    means for adjusting the rate of heat transfer from the exhaust manifold to the combustion chamber whereby timing of auto ignition of the air/fuel mixture in the combustion chamber is controlled during a combustion cycle;
    the means for recovering and transferring thermal energy comprising a heat tube with a heat input zone in thermal communication with the exhaust manifold and a heat outlet zone in thermal communication with the intake manifold.

3. The system set forth in claim 1 wherein the engine includes spark ignition means in the combustion chamber for igniting the gas charge delivered to the combustion chamber when the engine load increases for a given engine speed to an operating region in which homogeneous-charge burning in the combustion chamber is not stable and when the engine speed increases for a given engine load to an operating region in which homogeneous-charge burning in the combustion chamber is not stable.

4. The system set forth in claim 1 wherein the engine has multiple combustion chambers, each combustion chamber having an intake valve and an exhaust valve, an intake manifold communicating with each intake valve and an exhaust manifold communicating with each exhaust valve;

the means for recovering thermal energy and for transferring it to the gas charge in the intake manifold being common to each of the multiple combustion chambers.

5. A homogeneous-charge, compression-ignition engine having an engine coolant passage, a gas charge intake manifold and an exhaust gas manifold, an engine having a gas charge combustion chamber, a gas charge intake in the combustion chamber communicating with the intake manifold, an exhaust port in the combustion chamber communicating with the exhaust manifold;

means for recovering thermal energy of exhaust gas and engine coolant and for transferring it to gas charge in the intake manifold; and means for adjusting the rate of heat transfer from the exhaust gas manifold and engine coolant to the intake manifold whereby timing of auto-ignition of the air-fuel mixture in the combustion chamber is controlled during a combustion cycle.

6. A homogeneous-charge, compression-ignition engine system having a gas charge intake manifold and an exhaust gas manifold, an engine having an air-fuel combustion chamber, a gas charge intake manifold, a combustion chamber communicating with the intake manifold and an exhaust port in the combustion chamber communicating with the exhaust manifold;

a split inlet port communicating with the intake manifold, the intake port having first and second flow passages, the first flow passage communicating directly with the intake manifold whereby unheated ambient air is distributed to the intake manifold;

a heat exchanger communicating with the second flow passage and with the exhaust manifold, the second flow passage communicating with the intake manifold through the heat exchanger whereby air heated by exhaust gas is distributed to the intake manifold; and valve means for controlling the mass air ratio of heated air and unheated air delivered to the combustion chamber whereby the mass air ratio is adjusted to control the auto-ignition point in the combustion cycle and thereby establish optimum combustion efficiency.

7. The homogeneous-charge, compression-ignition engine system set forth in claim 6 wherein the valve means comprises an adjustable valve plate at flow entrance locations of the first and second flow passages, the valve plate reducing air flow through the first flow passage and increasing air flow through the second flow passage when it is adjusted in one direction, the valve plate increasing air flow through the first flow passage and decreasing air flow through the second flow passage when it is adjusted in the opposite direction whereby the effective temperature of air-fuel mixture in the intake manifold is controlled thus controlling the point of auto-ignition of the air-fuel mixture in the combustion chamber.

8. The system set forth in claim 7 wherein the heat exchanger communicates with the exhaust manifold whereby heat of the exhaust gas in the exhaust manifold is transmitted to inlet air-fuel mixtures in the intake manifold.

9. The system set forth in claim 8 wherein the engine includes engine coolant that is heated by combustion occurring in the combustion chamber, the system including further a second heat exchanger in the second flow passage in series relationship with respect to the heat exchanger communicating with the exhaust manifold, and a coolant flow passage extending from the engine to the second heat exchanger whereby thermal energy in the coolant is transferred to the air in the second flow passage.

10. The engine system set forth in claim 6 wherein the means for controlling the mass air ratio of heated air and unheated air comprises two intake valves in the combustion chamber, each intake valve communicating with a separate one of the flow passages, each intake valve being controllable to effect variable mass air ratio of heated air and unheated air.

11. The system set forth in claim 6 wherein the engine includes spark ignition means in the combustion chamber for igniting the gas charge delivered to the combustion chamber when the engine load increases for a given engine speed to an operating region in which homogeneous-charge burning in the combustion chamber is not stable and when the engine speed increases for a given engine load to an operating region in which homogeneous-charge burning in the combustion chamber is not stable.

12. A homogeneous-charge, compression-ignition engine system having a charge intake manifold and an exhaust gas manifold, an engine having a cylinder housing with engine coolant, an air-fuel combustion chamber, a charge intake port, a combustion chamber communicating with the intake manifold and an exhaust port in the combustion chamber communicating with the exhaust manifold;

a split inlet port communicating with the intake manifold, the intake port having first and second flow passages, the first flow passage communicating directly with the intake manifold whereby unheated ambient air is distributed to the intake manifold;

a first heat exchanger communicating with the second flow passage and with the exhaust manifold, the second flow passage communicating with the intake manifold through the first heat exchanger whereby air heated by exhaust gas is distributed to the intake manifold;

a second heat exchanger communicating with the engine coolant and with the second flow passage through the first heat exchanger whereby thermal energy is transferred from the engine coolant to the intake manifold; and valve means for controlling the mass air ratio of heated air and unheated air delivered to the intake manifold whereby the mass air ratio is adjusted to establish the auto-ignition point in the combustion cycle and thereby establish optimum combustion efficiency.

* * * * *